United States Patent
Pierce, Jr. et al.

(10) Patent No.: US 12,316,647 B1
(45) Date of Patent: May 27, 2025

(54) VIDEO DATA LOSS PREVENTION (vDLP)

(71) Applicant: Netskope, Inc., Santa Clara, CA (US)

(72) Inventors: Stevan W. Pierce, Jr., Camas, WA (US); Damian Charles Chung, Gilbert, AZ (US); Robert Wayne Butler, Rockport, IL (US); Madhura Sridhar, Hillsboro, OR (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/429,171

(22) Filed: Jan. 31, 2024

(51) Int. Cl.
*H04L 9/40* (2022.01)

(52) U.S. Cl.
CPC ......... *H04L 63/1408* (2013.01); *H04L 63/20* (2013.01)

(58) Field of Classification Search
CPC ............................ H04L 63/1408; H04L 63/20
USPC .......................................................... 726/26
See application file for complete search history.

(56) References Cited

U.S. PATENT DOCUMENTS

| | | | |
|---|---|---|---|
| 5,440,723 | A | 8/1995 | Arnold et al. |
| 6,513,122 | B1 | 1/2003 | Magdych et al. |
| 6,622,248 | B1 | 9/2003 | Hirai |
| 7,080,408 | B1 | 7/2006 | Pak et al. |
| 7,298,864 | B2 | 11/2007 | Jones |
| 7,376,719 | B1 | 5/2008 | Shafer et al. |
| 7,735,116 | B1 | 6/2010 | Gauvin |
| 7,966,654 | B2 | 6/2011 | Crawford |
| 8,000,329 | B2 | 8/2011 | Fendick et al. |
| 8,296,178 | B2 | 10/2012 | Hudis et al. |
| 8,793,151 | B2 | 7/2014 | DelZoppo et al. |
| 8,839,417 | B1 | 9/2014 | Jordan |
| 9,003,289 | B2 | 4/2015 | Gregg et al. |
| 9,087,297 | B1 | 7/2015 | Filippova et al. |
| 9,197,601 | B2 | 11/2015 | Pasdar |
| 9,225,734 | B1 | 12/2015 | Hastings |

(Continued)

FOREIGN PATENT DOCUMENTS

| | | |
|---|---|---|
| EP | 1063833 A2 | 12/2000 |
| JP | 2021525418 B | 12/2023 |

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

(Continued)

*Primary Examiner* — Anthony D Brown
(74) *Attorney, Agent, or Firm* — MUGHAL GAUDRY & FRANKLIN PC

(57) ABSTRACT

A video data loss prevention (vDLP) system that uses machine-learning for protection against data exfiltration of sensitive content across multiple tenants in a cloud-based network. The vDLP system consists of tenants that include end-user devices and a vDLP server. The vDLP server is configured to intercept traffic at an application layer of the cloud-based network and receive a video file from traffic. A viewer for the video file is remote from the cloud-based network. The vDLP server further recognizes text of audio and frames extracted from the video file using a machine-learning engine. The vDLP server then analyzes the frames and text using machine-learning classifiers, enforces policies against machine-learning classifiers for protection against data exfiltration of sensitive content in the video file, and sends a notification away from the cloud-based network upon detection of violation of a policy.

20 Claims, 12 Drawing Sheets

(56) References Cited

U.S. PATENT DOCUMENTS

| | | | |
|---|---|---|---|
| 9,231,968 | B2 | 1/2016 | Fang et al. |
| 9,280,678 | B2 | 3/2016 | Redberg |
| 9,811,662 | B2 | 11/2017 | Sharpe et al. |
| 10,060,751 | B1* | 8/2018 | Chen ................. G01C 21/3811 |
| 10,084,825 | B1 | 9/2018 | Xu |
| 10,237,282 | B2 | 3/2019 | Nelson et al. |
| 10,270,788 | B2 | 4/2019 | Faigon et al. |
| 10,334,442 | B2 | 6/2019 | Vaughn et al. |
| 10,360,498 | B2 | 7/2019 | Fergus et al. |
| 10,382,468 | B2 | 8/2019 | Dods |
| 10,484,334 | B1 | 11/2019 | Lee et al. |
| 10,826,941 | B2 | 11/2020 | Jain et al. |
| 11,032,301 | B2 | 6/2021 | Mandrychenko et al. |
| 11,036,856 | B2 | 6/2021 | Graun et al. |
| 11,281,775 | B2 | 3/2022 | Burdett et al. |
| 11,539,731 | B2 | 12/2022 | Akella et al. |
| 11,575,735 | B2 | 2/2023 | Cheng et al. |
| 11,714,906 | B2 | 8/2023 | Sharma et al. |
| 12,020,193 | B1* | 6/2024 | Penfield ................. G06V 40/11 |
| 2002/0099666 | A1 | 7/2002 | Dryer et al. |
| 2003/0055994 | A1 | 3/2003 | Herrmann et al. |
| 2003/0063321 | A1 | 4/2003 | Inoue et al. |
| 2003/0172292 | A1 | 9/2003 | Judge |
| 2003/0204632 | A1 | 10/2003 | Willebeek-LeMair et al. |
| 2004/0015719 | A1 | 1/2004 | Lee et al. |
| 2005/0010593 | A1 | 1/2005 | Fellenstein et al. |
| 2005/0271246 | A1 | 12/2005 | Sharma et al. |
| 2006/0156401 | A1 | 7/2006 | Newstadt et al. |
| 2007/0204018 | A1 | 8/2007 | Chandra et al. |
| 2007/0237147 | A1 | 10/2007 | Quinn et al. |
| 2008/0069480 | A1 | 3/2008 | Aarabi et al. |
| 2008/0134332 | A1 | 6/2008 | Keohane et al. |
| 2009/0144818 | A1 | 6/2009 | Kumar et al. |
| 2009/0249470 | A1 | 10/2009 | Litvin et al. |
| 2009/0300351 | A1 | 12/2009 | Lei et al. |
| 2010/0017436 | A1 | 1/2010 | Wolge |
| 2011/0119481 | A1 | 5/2011 | Auradkar et al. |
| 2011/0145594 | A1 | 6/2011 | Jho et al. |
| 2012/0278896 | A1 | 11/2012 | Fang et al. |
| 2013/0159694 | A1 | 6/2013 | Chiueh et al. |
| 2013/0298190 | A1 | 11/2013 | Sikka et al. |
| 2013/0347085 | A1 | 12/2013 | Hawthorn et al. |
| 2014/0013112 | A1 | 1/2014 | Cidon et al. |
| 2014/0068030 | A1 | 3/2014 | Chambers et al. |
| 2014/0068705 | A1 | 3/2014 | Chambers et al. |
| 2014/0259093 | A1 | 9/2014 | Narayanaswamy et al. |
| 2014/0282843 | A1 | 9/2014 | Buruganahalli et al. |
| 2014/0359282 | A1 | 12/2014 | Shikfa et al. |
| 2014/0366079 | A1 | 12/2014 | Pasdar |
| 2015/0100357 | A1 | 4/2015 | Seese et al. |
| 2016/0323318 | A1 | 11/2016 | Terrill et al. |
| 2016/0350145 | A1 | 12/2016 | Botzer et al. |
| 2017/0064005 | A1 | 3/2017 | Lee |
| 2017/0093917 | A1 | 3/2017 | Chandra et al. |
| 2017/0185841 | A1 | 6/2017 | Liu et al. |
| 2017/0213111 | A1 | 7/2017 | Cao et al. |
| 2017/0214949 | A1 | 7/2017 | Avetisyan et al. |
| 2017/0228618 | A1 | 8/2017 | Jiang et al. |
| 2017/0250951 | A1 | 8/2017 | Wang et al. |
| 2019/0109878 | A1* | 4/2019 | Boyadjiev ............... G06N 5/022 |
| 2020/0050686 | A1 | 2/2020 | Kamalapuram et al. |
| 2021/0227291 | A1 | 7/2021 | Wolowiec et al. |
| 2022/0284218 | A1 | 9/2022 | Yang et al. |
| 2022/0415037 | A1 | 12/2022 | Zhang et al. |

OTHER PUBLICATIONS

Huckaby, Jeff Ending Clear Text Protocols, Rackaid.com, Dec. 9, 2008, 3 pgs.

Nevvton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

McCullagh, Declan, "How safe is instant messaging? A security and privacy survey," CNET, Jun. 9, 2008, 14 pgs.

Beck et al. "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54.

Zetter, Kim, "Revealed: The Internet's Biggest Security Hole," Wired, Aug. 26, 2008, 13 pgs.

Adya et al., Farsite: Federated, available, and reliable storage for an incompletely trusted environment, SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al., Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~:text=mode of communication.-,What are the different email protocols%3F,and also has defined functions.

NIIT, Special Edition Using Storage Area Networks, Que, 2002, 6 pgs.

Chapple, Mike, "Firewall redundancy: Deployment scenarios and benefits," Tech Target, 2005, 5 pgs. available at https://www.techtarget.com/searchsecurity/tip/Firewall-redundancy-Deployment-scenarios-and-benefits?%20Offer=abt_pubpro_AI-Insider.

Fortinet, FortiGate—3600 User Manual (vol. 1, Version 2.50 MR2) Sep. 5, 2003, 329 pgs.

Fortinet, FortiGate SOHO and SMB Configuration Example, (Version 3.0 MR5), Aug. 24, 2007, 54 pgs.

Fortinet, FortiSandbox—Administration Guide, (Version 2.3.2), Nov. 9, 2016, 191 pgs.

Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.

Fortinet,FortiOS—Administration Guide, (Versions 6.4.0), Jun. 3, 2021, 1638 pgs.

Heady et al., "The Architecture of a Network Level Intrusion Detection System," University of New Mexico, Aug. 15, 1990, 21 pgs.

Kephart et al., "Fighting Computer Viruses," Scientific American (vol. 277, No. 5) Nov. 1997, pp. 88-93.

Wang, L., Chapter 5: Cooperative Security in D2D Communications, "Physical Layer Security in Wireless Cooperative Networks," 41 pgs. first online on Sep. 1, 2017 at https://link.springer.com/chapter/%2010.1007/978-3-319-61863-0_5.

Lee et al., "A Data Mining Framework for Building Intrusion Detection Models," Columbia University, n.d. 13 pgs.

Merriam-Webster Dictionary, 2004, 5 pgs.

Microsoft Computer Dictionary, (5th Ed.), Microsoft Press, 2002, 8 pgs.

Microsoft Computer Dictionary, (4th Ed.), Microsoft Press, 1999, 5 pgs.

Mika et al. "Metadata Statistics for a Large Web Corpus," LDOW2012, Apr. 16, 2012, 6 pgs.

Oxford Dictionary of Computing (6th Ed.), 2008, 5 pgs.

(56) References Cited

OTHER PUBLICATIONS

Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P 2000, May 2000, pp. 44-55.
Dean, Tamara, Guide to Telecommunications Technology, Course Technology, 2003, 5 pgs.
U.S. Appl. No. 60/520,577, "Device, System, and Method for Defending a Computer Network," filed Nov. 17, 2003, 21 pgs.
U.S. Appl. No. 60/552,457, "Fortinet Security Update Technology," filed Mar. 2004, 6 pgs.
Tittel, Ed, Unified Threat Management For Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.

\* cited by examiner

800

802 {
ffmpeg version 2023-08-20-git-f0b1cab538-full_build-www.gyan.dev Copyright (c) 2000-2023 the FFmpeg developers
built with gcc 12.2.0 (Rev10, Built by MSYS2 project)
configuration: --enable-gpl --enable-version3 --enable-static --disable-w32threads --disable-autodetect --enable-fontconfig --enable-iconv --enable-gnutls
libavutil 58. 17.100 / 58. 17.100
libavcodec 60. 23.100 / 60. 23.100
libavformat 60. 10.100 / 60. 10.100
libavdevice 60. 2.101 / 60. 2.101
libavfilter 9. 11.100 / 9. 11.100
libswscale 7. 3.100 / 7. 3.100
libswresample 4. 11.100 / 4. 11.100
libpostproc 57. 2.100 / 57. 2.100
-vsync is deprecated. Use -fps_mode
Input #0, mov,mp4,m4a,3gp,3g2,mj2, from 'GMT20230823-202543_Recording_2560x1440.mp4': Metadata: major_brand : mp42
minor_version : 0
compatible_brands: isommp42

804 {
creation_time : 2023-08-23T20:25:43.000000Z
Duration: 00:47:37.32, start: 0.000000, bitrate: 386 kb/s Chapters: Chapter #0:0: start 0.000000, end 2839.160000
Metadata:
title : Sharing Started
Chapter #0:1: start 2839.160000, end 2842.560000
Metadata:
title : Sharing Stopped
Metadata:

806 {
creation_time : 2023-08-23T20:25:43.000000Z
handler_name : H.264/AVC video
vendor_id : [0][0][0][0]
encoder : AVC Coding
Stream #0:2[0x3](und): Data: bin_data (text / 0x74786574)
Side data:
cpb: bitrate max/min/avg: 0/0/200000 buffer size: 0 vbv_delay: N/A
[out#0/image2 @ 0000026d6ff18840] video:12911kB audio:0kB subtitle:0kB other streams:0kB global headers:0kB muxing overhead: unknown 808 {
frame= 133 fps=0.5 q=5.9 Lsize=N/A time=00:47:24.08 bitrate=N/A speed=11.3x

FIG. 8

VIDEO DATA LOSS PREVENTION (vDLP)

BACKGROUND

This disclosure relates, in general, to internet security systems and, not by way of limitation, to the classification of activities, among other things.

Video files are crucial for modern enterprises, serving various purposes such as training, communication, and documentation. In cloud-based systems, these files enhance collaboration, provide engaging content, and foster a dynamic communication environment. However, sharing video files poses risks, including potential data security breaches due to sensitive information. Ensuring encryption and secure sharing mechanisms is essential to protect sensitive information.

Intellectual property risks arise from improper sharing of proprietary videos, leading to financial losses and damage to the company's reputation. Compliance with industry regulations is crucial, and failure to comply can result in legal consequences. Network bandwidth challenges arise from the large size of video files, straining resources and potentially causing slower internet speeds. Storage constraints are practical, as numerous video files require significant capacity. Reputation damage is a tangible risk, impacting customer trust, employee morale, and relationships with partners and stakeholders. Mitigating this risk involves establishing clear guidelines, emphasizing ethical practices, and maintaining a culture of responsible content dissemination. In conclusion, video files are essential for enhancing enterprise communication and collaboration but also pose inherent dangers.

SUMMARY

In one embodiment, the present disclosure provides a video data loss prevention (vDLP) system that uses machine-learning for protection against data exfiltration of sensitive content across multiple tenants in a cloud-based network. The vDLP system consists of tenants that include end-user devices and a vDLP server. The vDLP server is configured to intercept traffic at an application layer of the cloud-based network and receive a video file from traffic, wherein a viewer for the video file is remote from the cloud-based network. The vDLP server further recognizes text of audio and frames extracted from the video file using a machine-learning engine. The vDLP server then analyzes the frames and text using machine-learning classifiers, enforces policies against machine-learning classifiers for protection against data exfiltration of sensitive content in the video file, and sends a notification away from the cloud-based network upon detection of violation of a policy.

In an embodiment, a video data loss prevention (vDLP) system that uses machine learning for protection against data exfiltration of sensitive content across multiple tenants in a cloud-based network. The vDLP system comprises of tenants that include end-user devices and a vDLP server. The vDLP server is configured to intercept traffic at an application layer of the cloud-based network and receive a video file from traffic, wherein a viewer for the video file is remote from the cloud-based network. The vDLP server further recognizes text of audio and frames extracted from the video file using a machine learning engine. The machine learning engine uses artificial intelligence to recognize text and content of the video file. The vDLP server then analyzes the frames and text using machine learning classifiers and enforces policies against machine learning classifiers for protection against data exfiltration of sensitive content in the video file. The machine learning classifier can be pre-trained or customized. The machine learning classifier are configured to analyze the text for sensitive information, match a watermark embedded in the video file with watermarks stored in a meta database, and classify the video file as sensitive content if sensitive information is detected or the watermark is matched. In response to enforcing the policies, the vDLP server sends a notification away from the cloud-based network upon detection of violation of a policy.

In an embodiment, a video data loss prevention (vDLP) method using machine learning for protection against data exfiltration of sensitive content across multiple tenants in a cloud-based network. The vDLP method comprises intercepting traffic at an application layer of the cloud-based network and receiving a video file from traffic, wherein a viewer for the video file is remote from the cloud-based network. The vDLP method further comprises recognizing text of audio and frames extracted from the video file using a machine learning engine. The machine learning engine uses artificial intelligence to recognize text and content of the video file. The vDLP method further includes analyzing the frames and text using machine learning classifiers and enforcing policies against machine learning classifiers for protection against data exfiltration of sensitive content in the video file. The machine learning classifier can be pre-trained or customized. The machine learning classifier are configured to analyze the text for sensitive information, match a watermark embedded in the video file with watermarks stored in a meta database, and classify the video file as sensitive content if sensitive information is detected or the watermark is matched. In response to enforcing the policies, the vDLP method comprises sending a notification away from the cloud-based network upon detection of violation of a policy.

In yet another embodiment, a computer-readable media is discussed having computer-executable instructions embodied thereon that when executed by one or more processors, facilitate a video data loss prevention (vDLP) method using machine learning for protection against data exfiltration of sensitive content across multiple tenants in a cloud-based network. The vDLP method comprises intercepting traffic at an application layer of the cloud-based network and receiving a video file from traffic, wherein a viewer for the video file is remote from the cloud-based network. The vDLP method further comprises recognizing text of audio and frames extracted from the video file using a machine learning engine. The machine learning engine uses artificial intelligence to recognize text and content of the video file. The vDLP method further includes analyzing the frames and text using machine learning classifiers and enforcing policies against machine learning classifiers for protection against data exfiltration of sensitive content in the video file. The machine learning classifier can be pre-trained or customized. The machine learning classifier are configured to analyze the text for sensitive information, match a watermark embedded in the video file with watermarks stored in a meta database, and classify the video file as sensitive content if sensitive information is detected or the watermark is matched. In response to enforcing the policies, the vDLP method comprises sending a notification away from the cloud-based network upon detection of violation of a policy.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIG. 8 illustrates user-by-user and file-by-file interactions of users extracted from frames of a video file;

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1A:
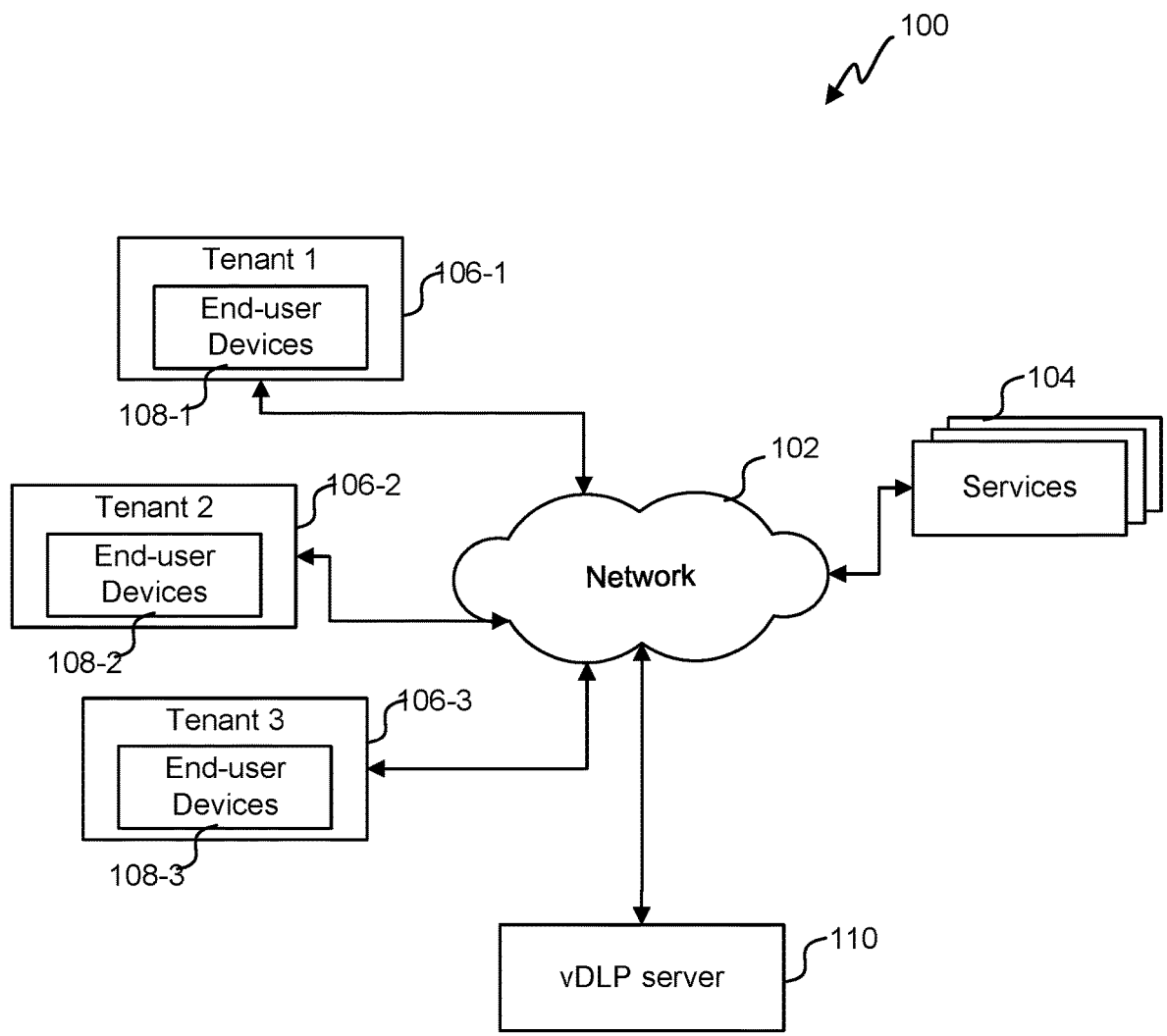
FIGS. 1A-1B illustrates a block diagram of an embodiment of a video data loss prevention (vDLP) system in a cloud-based multi-tenant system/environment.

Referring to FIG. 1A, a block diagram of an embodiment of a video data loss prevention (vDLP) system 100 in a cloud-based multi-tenant system/environment is shown. A multi-tenant environment handles security, quality of service compliance, service level agreement enforcement, service request metering, and other management activities relating to the vDLP system 100. The vDLP system includes a network 102, services 104, tenants 106 (106-1, 106-2, 106-3), end-user devices 108 (108-1, 108-2, 108-3), and a vDLP server 110. The network 102 is any Internet network connecting the tenants 106, the vDLP server 110, and the services 104. The services 104 are software solutions that are local applications, or software as a service (SaaS) which are hosted and maintained by third-party vendors/cloud providers and provided to the end-user devices 108 over the network 102, such as the Internet. The services 104 can also be hosted within the data center of an enterprise. The end-user device 108 uses content and processing for content sites, for example, websites, streaming content, etc., and the services 104, for example, SaaS tools, databases, cloud service providers, etc. The terms "services" and "applications" are used interchangeably in this application.

The tenants 106 contain multiple end-user devices 108 that access the services 104. The end-user devices 108, including a cloud application or subscription that is owned or accessible to the user and other physical devices, such as smartphones, tablets, personal computers (PCs), and many other computers, communicate with the services 104 using the network 102. The end-user devices 108 runs on any popular operating system (OS) such as Windows™, iOS™, Android™, Linux, set-top box OSes, and Chromebook™. The vDLP server 110 addresses the potential for loss of data contained in videos as well as audio files by using artificial intelligence (AI) to render audio and video in formats recognizable by data loss prevention (DLP) engines. AI/machine-learning (ML) engine converts audio to text and video to frames which are both then analyzed by DLP policies. Frames are analyzed with machine-learning classifiers which are stereotypical, screenshots whiteboards etc., or custom classifiers developed around watermarks or other custom identification objects relevant to each video.

Figure 1B:
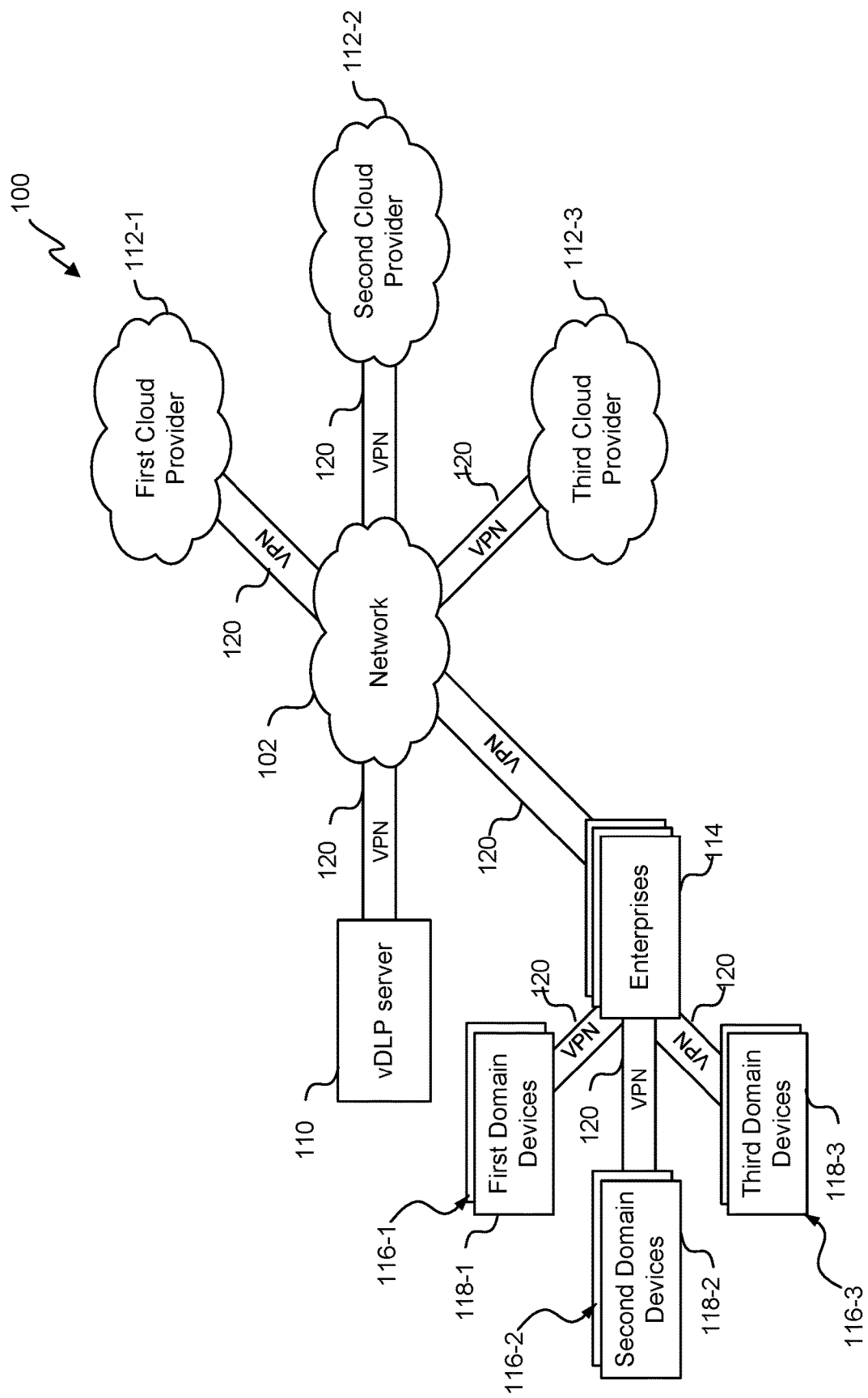

Referring to FIG. 1B, a block diagram of an embodiment of the vDLP system 100 is shown. The vDLP system 100 allows multiple tenants in different domains to communicate with various cloud providers over the network 102. The vDLP system 100 may be a multi-tenant cloud-based system or a single-tenant cloud-based system. The vDLP system 100 includes multiple servers. The vDLP system 100 allows multiple tenants/multi-tenant systems or enterprises 114 to use the same network separated by a domain or some other logical separation. Encryption, leased/encrypted tunnels, firewalls, and/or gateways can be used to keep the data from one enterprise 114 separate from the other enterprise 114. The vDLP server 110 provides multi-tenancy control, policies, and data loss protection for individual domain data centers.

The vDLP system 100 may include a first computing environment 116-1 having end-user devices for a first domain 118-1, a second computing environment 116-2 having end-user devices for a second domain 118-2, and a third computing environment 116-3 having end-user devices for a third domain 118-3. Individual domain communicates with the enterprise 114 using a virtual private network (VPN) 120 over local area networks (LANs), wide area networks (WANs), and/or the network 102. Instead of the VPN 120 as an end-to-end path, tunneling (e.g., Internet Protocol in Internet Protocol (IP-in-IP), Generic Routing Encapsulation (GRE)), policy-based routing (PBR), exterior gateway protocols, Border Gateway Protocol (BGP)/Interior Gateway Protocol (IGP) route protocols, or proxies could be used. Cloud providers 112 for offering remote services may include public or private clouds including Web/Software as a service (SaaS), and voice/video connected to the vDLP server 110 via VPN 120.

Enterprises 114 are connected to the vDLP server 110 using the VPN 120 over the network 102. Some examples of the cloud providers 112 include Amazon Web Services (AWS)®, Google Cloud Platform (GCP)®, and Microsoft Azure®. The applications provided by the cloud providers 112 include Office 365®, Box™, Zoom™, and Salesforce™ etc. With the cloud application providers, the user subscribes to a set of services provided by these application providers. Some or all of the cloud providers 112 may be different from each other, for example, the first cloud provider 112-1 may run Amazon Web Services (AWS)®, the second cloud provider 112-2 may run Google Cloud Platform (GCP)®, and the third cloud provider 112-3 may run Microsoft Azure®. Although three cloud providers 112 are shown, any suitable number of cloud providers 112 may be provided that might be strictly captive to a particular enterprise or otherwise not accessible to multiple domains.

Each of the cloud providers 112 may communicate with the network 102 using a secure connection. For example, the first cloud provider 112-1 may communicate with the network 102 via the VPN 120, the second cloud provider 112-2 may communicate with the network 102 via a different VPN, and the third cloud provider 112-3 may communicate with the network 102 via yet another VPN. Some embodiments could use leased connections or physically separated connections to segregate traffic, or a logical separation could be used in other embodiments. Although one VPN is shown, it is to be understood that there are many VPNs to support different end-user devices, tenants, domains, etc.

Enterprises 114 may also communicate with the network 102 and the end-user devices 108 for their domain via VPNs 120. Some examples of the enterprises 114 may include corporations, educational facilities, governmental entities, and private consumers. Each enterprise may support one or more domains to logically separate its networks. The end-user devices 108 for each domain may include individual computers, tablets, servers, handhelds, and network infrastructure that are authorized to use computing resources of their respective enterprises.

Further, the vDLP server 110 may communicate with the network 102 via the VPN 120. Communication between the vDLP server 110 and the cloud providers 112 (cloud application providers) for a given enterprise 114 can be either a VPN connection or tunnel depending on the preference of the enterprise 114. The vDLP server 110 uses machine-learning classifiers, custom or pre-trained, to analyze extracted frames of videos to protect against data exfiltration of sensitive content. Video files are uploaded to the network 102 and frames are extracted from the videos themselves using scene detection changes in the video itself. Those frames are then run through the DLP engines using ML classifiers. If custom classifiers are used, the ML classifiers would be trained using key objects such as watermarks embedded in the video. This in result provides dual layer ML classifier protections of pre-trained and custom classifiers. The connection between the tenants 106 and the vDLP server 110 is over an encrypted VPN 120 or tunnel.

Figure 2:
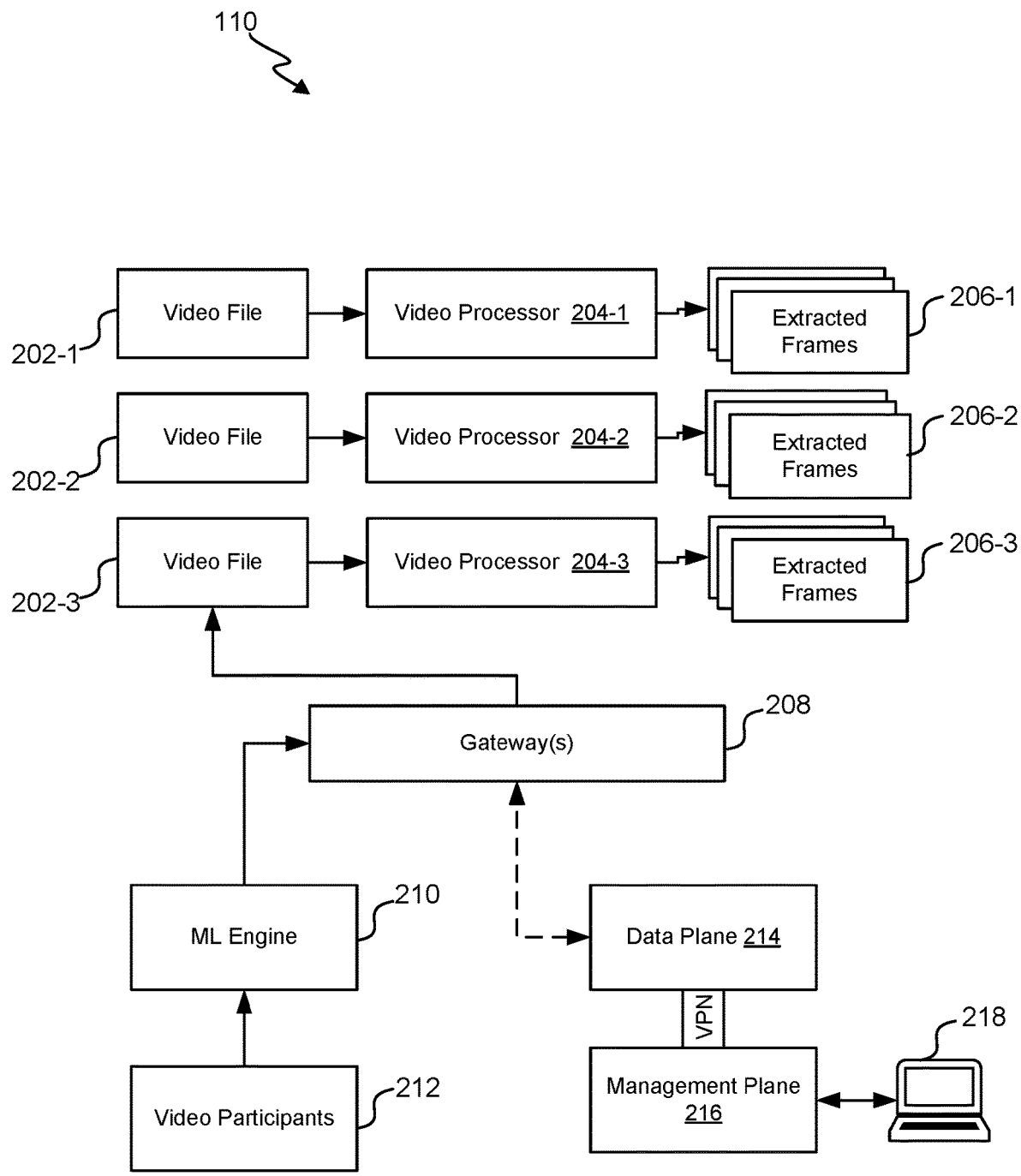
FIG. 2 illustrates a block diagram of an embodiment of a vDLP server.

Referring next to FIG. 2, a block diagram of an embodiment of the vDLP server 110 is shown. The vDLP server 110 includes video files 202 (202-1, 202-2, 202-3), video processors 204 (204-1, 204-2, 204-3), extracted frames 206 (206-1, 206-2, 206-3), and gateways 208. The vDLP server 110 further consists of an ML engine 210, video participants 212, a data plane 214, a management plane 216, and a web user interface (UI) 218. The vDLP server 110 provides protection against data leakage via video file sharing that contains sensitive content. Data security of the sensitive content in the video file 202 is primary job of the vDLP server 110. The data security categories for the sensitive content may include confidential, internal, public, personally identifiable information (PII), financial data, regulated data, intellectual property, and others.

The vDLP server 110 scans data in the video file 202 using a pre-configured or pre-trained ML classifier, which the enterprise 114 or the end-user device 108 may later customize, to help identify the key objects of data. The key objects of data can be PII, financial data, unique number combination, or a watermark embedded in the video file 202. The vDLP server 110 also implements policies to handle different interactions and activities in the video file 202. Government requirements specify the DLP policies for handling sensitive data. DLP solutions typically apply pre-configured rules or policies based on various regulations, such as health insurance portability and accountability act (HIPAA) or general data protection regulation (GDPR). To administer the policies, the vDLP server 110 prevents and monitors outgoing channels (like email and web chat) and provides options for handling potential security breaches. For instance, an employee about to send an email with a sensitive attachment might receive a pop-up that suggests encrypting the message, or the vDLP system 100 might block it entirely or redirect it to a manager. The response is based on rules the enterprise 114 establishes.

The video files 202 contain the activities or interactions of the end-user devices 108 on the services 104. The video files 202 are in any kind of video format i.e., MP4, MPEG, MOV, AVI, WMV, AVCHD, WebM, and FLV etc. The video participants 212 are also the video files 202 or snippets from the video files 202. The gateways 208 in the vDLP server 110 are used to monitor, control, and secure the flow of sensitive content within the enterprise 114. The gateways 208 act as entry points for videos leaving or entering the network 102, allowing administrators or viewers to enforce policies and prevent unauthorized file sharing and data transfers. This helps in preventing data leaks and ensuring compliance with security regulations. Examples of the gateways 208 in the vDLP server 110 include dedicated DLP appliances or software solutions the integrate with existing network infrastructure. Some popular vendors providing DLP gateways include Symantec, McAfee, Forcepoint, and digital guardian. Examples of the gateway 208 technologies provided by such vendors include enterprise data loss prevention (EDLP), PHX (ProxySG) etc.

The ML engine 210 performs video exfiltration and text exfiltration by using machine-learning or artificial intelligence (AI) engines. The activities of internal users regarding the video files 202 is managed and analyzed by the ML engine 210. If the internal user has downloaded, uploaded, shared, or edited a video file while using the services 104 on the network 102, then the ML engine 210 detects the video file 202 that is watermarked. The watermarked video is downloaded, and its frames are extracted for further inspection. The ML engine 210 employs AI to convert audio of the video file 202 into text, the text is then downloaded in the ML engine 210. The ML engine 210 also creates a summary of the audio-to-text conversion process and sends it to the gateways 208 and the management plane 216 for further investigation.

The data plane 214 works together with the gateways 208 and enforces policies, inspects content of the video files 202, and provides insights from the extracted frames 206 to the user or viewer. The data plane 214 handles transmission, reception, and forwarding of data packets while adhering to the pre-defined policies and rules. The data plane 214 uses machine-learning classifiers to ensure that sensitive content and unauthorized data is recognized and appropriately handled according to security policies. The data plane 214 further provides traffic filtering, load balancing, and acceleration and optimization of data flows. The data plane 214 manages meta databases or temporary databases i.e., a Redis to store the policies belonging to a user from one tenant separate from other users. The data plane 214 also stores the watermarks embedded in the video files 202 or key objects/data content from the video files 202 and the extracted frames 206.

The management plane 216 is connected to the data plane 214 via a secured tunnel i.e., VPN. The DLP tasks from the data plane 214 get assisted by the management plane 216. The management plane 216 monitors and controls the entire structure of the vDLP server 110. The management plane 216 provides introspection, controls email traffic, balances load, overseas DLP services and cache lookup. The management plane 216 further manages the query service, facilitates event streaming and monitoring through Kafka and web UI 218. The web UI 218 allows the viewer or the enterprise 114 to customize their policies and machine-learning classifiers.

Figure 3:
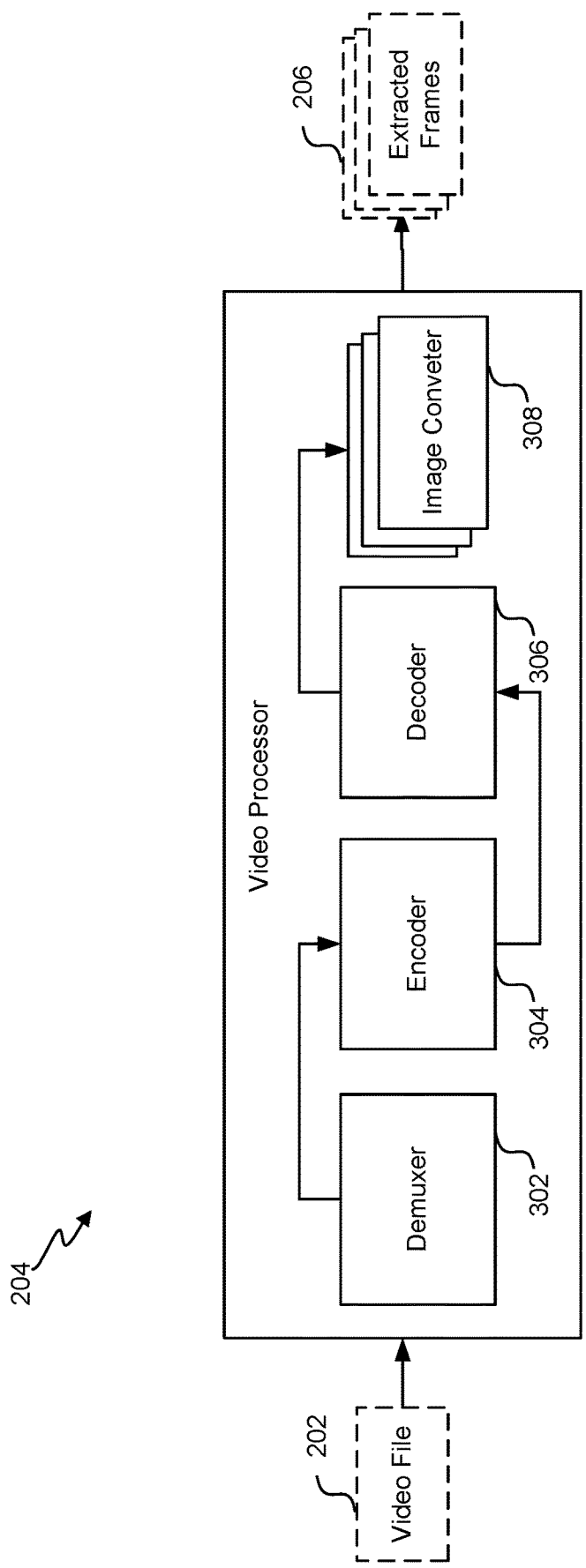
FIG. 3 illustrates a block diagram of an embodiment of a video processor of the vDLP server.

Referring next to FIG. 3, a block diagram of an embodiment of the video processor 204 of the vDLP server 110 is shown. The video processor 204 manipulates data from the video file 202 and converts it into a picture format and outputs the extracted frames 206. The video processor 204 consists of a demuxer 302, an encoder 304, a decoder 306, and an image converter 308. The demuxer 302 separates the multiplexed data streams within an MPEG video file. In the context of video processing, the demuxer 302 extracts the video stream from the video file 202, separating it from other components like audio and subtitles.

The demuxer 302 prepares the video data for subsequent processing stages by isolating the relevant content. For example, using ffmpeg, the demuxer 302 extracts the video stream from the input MPEG file, creating an intermediate video file. The encoder 304 takes the raw video data and compresses it using a specified encoding algorithm. This compression is used for reducing the file size while maintaining acceptable video quality. In video processing pipeline, the encoder 304 transforms the split video stream into an encoded data format, making it more storage and bandwidth efficient. For example, the x264 encoder compresses the video stream from the intermediate file into H.264-encoded data.

The decoder 306 performs the reverse process of the encoder 304. The decoder 306 takes the compressed, encoded video data and decodes it back into a raw format, ready for further manipulation. In the video processor 204, the decoder 306 converts the encoded data (e.g., H.264) back into raw video frames, ensuring that the original content is restored. For example, using MPEG, the decoder 306 processes the H.264-encoded data, creating a raw video file in YUV format. The image converter 308 is responsible for transforming raw video frames into a desired image format, such as JPG. This step is essential when the goal is to extract still images from the video stream. Each frame is converted to the specified image format, allowing for easy viewing, storage, or sharing of individual video frames. For this purpose, ffmpeg tool is used that processes the raw YUV video frames, converting them into individual JPG images.

The video processor 204 takes in different commands for rendering the video file 202. For example, the ffmpeg command analyzes the input video, identifies key frames based on scene changes, and saves these key frames as individual JPG images with filenames following the specified pattern. An exemplary command is given below:

"ffmpeg -i GMT20230823-202543_Recording_2560x1440.mp4 -vf "select='gt(scene,0.1)'"-vsync vfr frameX-%2d.jpg"

The video processor 204 upon detecting scene changes extract several frames from the video file 202. So that the ML engine 210 can analyze the internal user activity in the video file 202 from several angles. For example, a rogue employee of an organization tries sharing the video of the plant machinery on the network 102. The ML engine 210 knows what the plant machinery looks like but is not confident whether the video contains which specific plant. In that case, the several extracted frames 206 help the ML engine 210 in making the decision. By implementing DLP services further, the prohibited sharing of company secrets on the network 102 can be handled.

Figure 4:
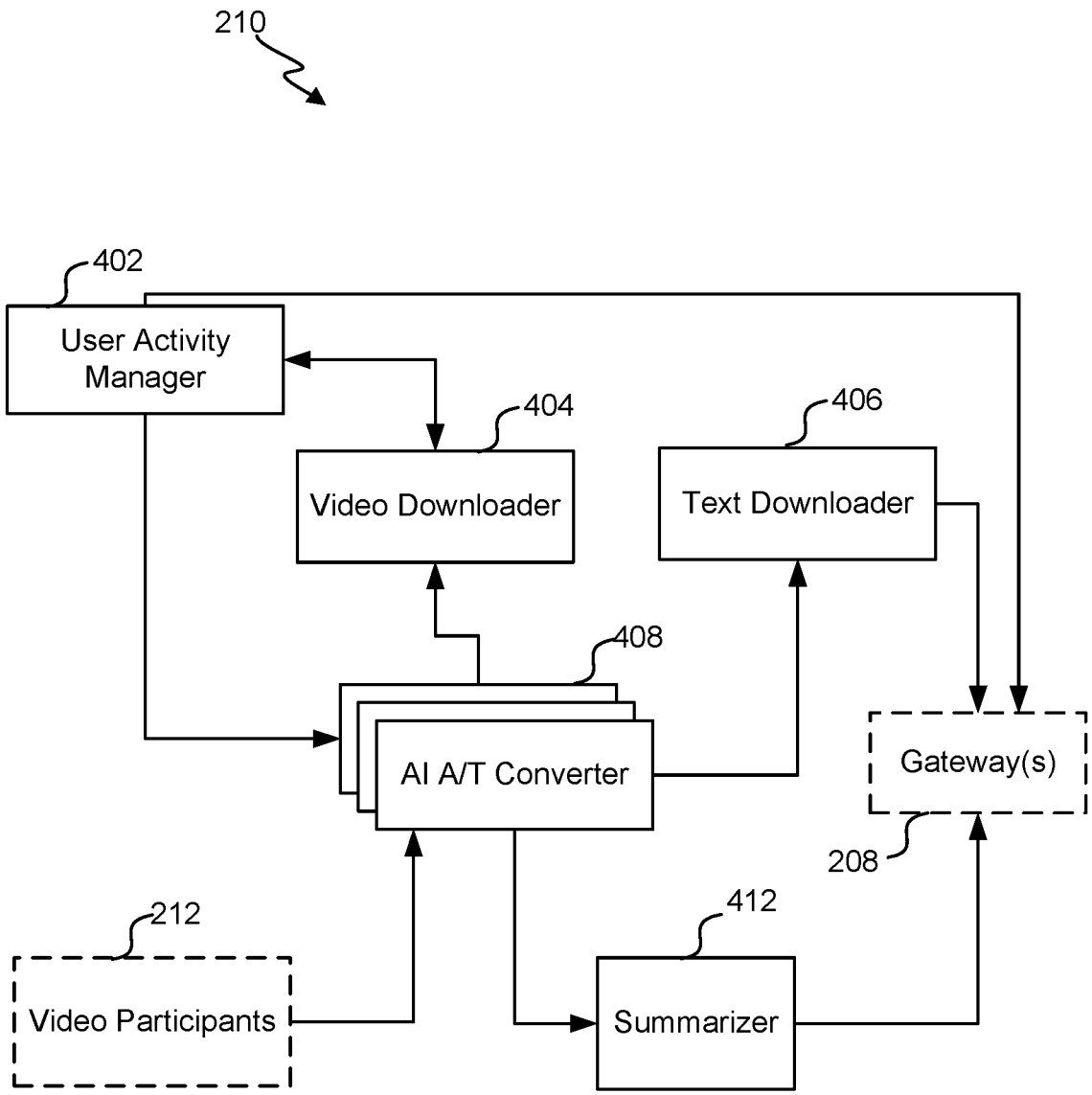
FIG. 4 illustrates a block diagram of an embodiment of a machine-learning (ML) engine of the vDLP server.

Referring next to FIG. 4, a block diagram of an embodiment of the ML engine 210 of the vDLP server 110 is shown. The ML engine 210 uses artificial intelligence (AI) or machine learning (ML) engines to accomplish text and video exfiltration. The ML engine 210 is responsible for managing and analyzing internal users' activities related to the video files 202. The ML engine 210 recognizes the watermarked video file 202 if the internal user downloaded, published, shared, or altered it while utilizing the services 104 on the network 102. The watermarked video is downloaded, and its frames are extracted for further inspection. The text is then downloaded into the ML engine 210 after the AI in the ML engine 210 transforms the audio of the video file 202 into text. The ML engine 210 also creates a summary of the audio to text conversion and process and sends it to the gateways 208 and the management plane 216 for further investigation.

The ML engine 210 consists of a user activity manager 402, a video downloader 404, a text downloader 406, an AI audio to text (A/T) converter 408, and a summarizer 412. The user activity manager 402 analyzes the activities of internal users with the video files 202 i.e., downloading, uploading, sharing, or rendering a video file. If any such activity is involved, the user activity manager 402 flags that video file 202 and sends it to the gateways 208 for processing. The video file 202 that is flagged by the user activity manager 402 is downloaded by the video downloader 404. The user activity manager 402 also sends such video file to the AI A/T converter 408 that also takes input from the video participants 212.

The AI A/T converter 408 uses AI to fill in gaps in the audio to text conversion process. The AI A/T converter 408 is a transcription software that uses AI and automatically recognizes speech and transcribes what is being said into its equivalent written format. Traditionally, a human would listen to the audio file and type it into a text file to repurpose the spoken content for different media. But now, using artificial intelligence, the ML engine 210 can easily convert audio to text in a short time and make the content usable for different purposes like search, subtitles, and insights. The AI A/T converter 408 reduces transcription time, increases efficiency and productivity, and improves the accessibility of digital media. The AI A/T converter 408 recognizes speech by using machine learning (ML) and artificial intelligence (AI). Machine learning is the technology that trains computers in speech recognition by storing and analyzing a very high volume of speech data. When audio files are provided, the AI A/T converter 408 analyzes them by using two main components namely acoustic component and linguistic component. The acoustic component is the software that converts the audio file into a sequence of acoustic units. Acoustic units are the digital signals that represent sound waves or the sound vibrations a person makes when he talks.

Acoustic speech recognition technology matches the acoustic units to sounds that make up the human language, called phonemes. For example, English has 44 phonemes that combine to form all the words in the language. Phonemes can be used to automatically convert audio to text in many languages. While the acoustic component hears the word, the linguistic component understands and spells it. For example, many words in English sound the same but are spelled differently. The words to, two, and too all sound the same, but a person or computer that is transcribing audio must understand them in context. The linguistic component analyzes all the preceding words and their relationships to estimate which word is likely to come next. It then converts the sequence of acoustic units into words, sentences, and paragraphs that make sense to humans. This speech recognition technology is similar to the auto-suggest function in the smartphone that automatically suggests words when the user types anything.

The text extracted from the AI A/T converter 408 is downloaded and compiled into a file format using the text downloader 406. The AI A/T converter 408 also creates a summary of the insights gained from the audio to text conversion process using the summarizer 412. The text downloader 406 and the summarizer 412 send files to the gateways 208, that send it further to the DLP services to detect data exfiltration.

Figure 5:
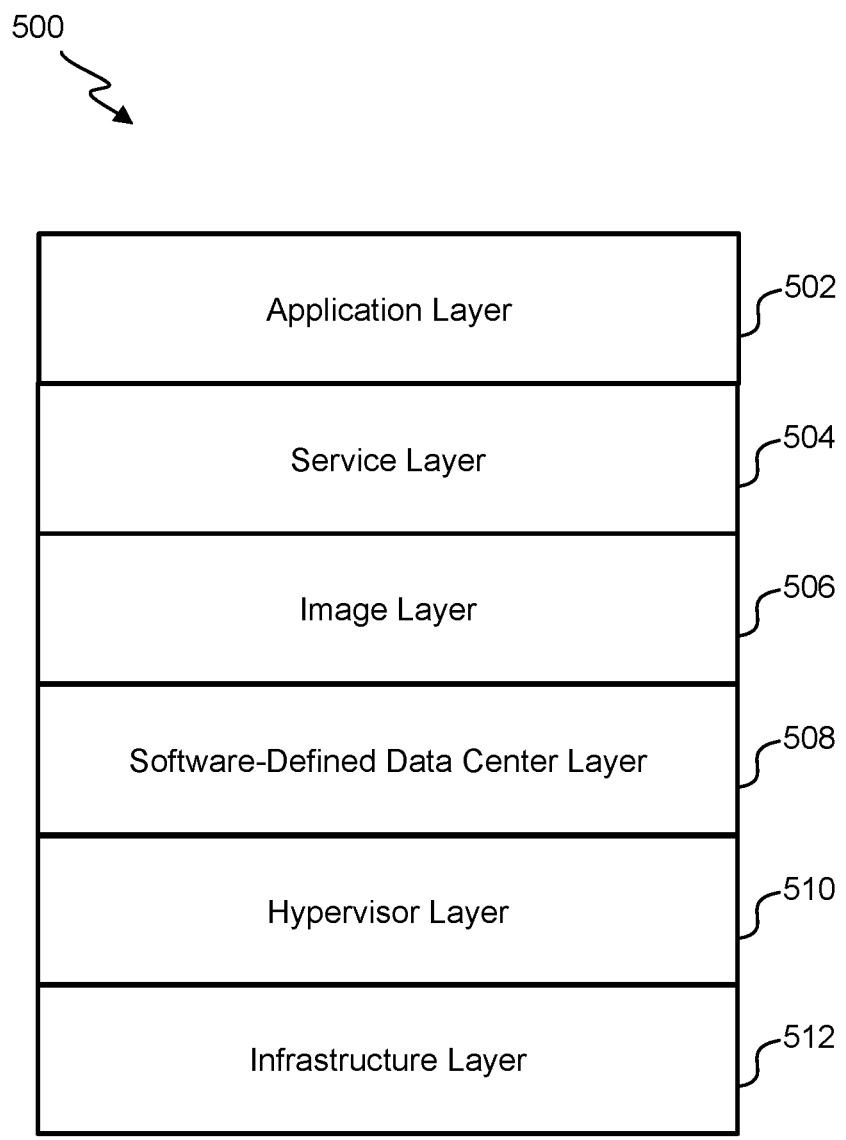
FIG. 5 illustrates a block diagram of an embodiment of a cloud OSI model.

Referring next to FIG. 5, a block diagram of an embodiment of a cloud open systems interconnection (OSI) model 500 is shown. The cloud OSI model 500 for cloud computing environments partitions the flow of data in a communication system into six layers of abstraction. The cloud OSI model 500 for cloud computing environments can include, in order: the application layer 502, a service layer 504, an image layer 506, a software-defined data center layer 508, a hypervisor layer 510, and an infrastructure layer 512. The respective layer serves a class of functionality to the layer above it and is served by the layer below it. Classes of functionality can be realized in software by various communication protocols.

The infrastructure layer 512 can include hardware, such as physical devices in a data center, that provides the foundation for the rest of the layers. The infrastructure layer 512 can transmit and receive unstructured raw data between a device and a physical transmission medium. For example, the infrastructure layer 512 can convert the digital bits into electrical, radio, or optical signals.

The hypervisor layer 510 can perform virtualization, which can permit the physical devices to be divided into virtual machines that can be bin-packed onto physical machines for greater efficiency. The hypervisor layer 510 can provide virtualized computing, storage, and networking. For example, OpenStack® software that is installed on bare metal servers in a data center can provide virtualization cloud capabilities. The OpenStack® software can provide various infrastructure management capabilities to cloud operators and administrators and can utilize the Infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

The software-defined data center layer 508 can provide resource pooling, usage tracking, and governance on top of the hypervisor layer 510. The software-defined data center layer 508 can enable the creation of virtualization for the Infrastructure-as-Code concept by using representational state transfer (REST) application programming interfaces (APIs). The management of block storage devices can be virtualized, and end-users can be provided with a self-service API to request and consume those resources which do not entail any knowledge of where the storage is deployed or on what type of device. Various compute nodes can be balanced for storage.

The image layer 506 can use various operating systems and other pre-installed software components. Patch management can be used to identify, acquire, install, and verify patches for products and systems. Patches can be used to rectify security and functionality problems in software. Patches can also be used to add new features to operating systems, including security capabilities. The image layer 506 can focus on the computing in place of storage and networking. The instances within the cloud computing environments can be provided at the image layer 506.

The service layer 504 can provide middleware, such as functional components that applications use in tiers. In some examples, the middleware components can include databases, load balancers, web servers, message queues, email services, or other notification methods. The middleware components can be defined at the service layer 504 on top of specific images from the image layer 506. Different cloud computing environment providers can have different middleware components. The application layer 502 can interact with software applications that implement a communicating component. The application layer 502 is the layer that is closest to the end-user. Functions of the application layer 502 can include identifying communication partners, determining resource availability, and synchronizing communications. Applications within the application layer 502 can include custom code that makes use of middleware defined in the service layer 504.

Various features discussed above can be performed at one or more layers of the cloud OSI model 500 for cloud computing environments. For example, translating the general policies into specific policies for different cloud computing environments can be performed at the service layer 504 and the software-defined data center layer 508. Various scripts can be updated across the service layer 504, the image layer 506, and the software-defined data center layer 508. Further, APIs and policies can operate at the software-defined data center layer 508 and the hypervisor layer 510.

Different cloud computing environments can have different service layers 504, image layers 506, software-defined data center layers 508, hypervisor layers 510, and infrastructure layers 512. Further, respective cloud computing environments can have the application layer 502 that can make calls to the specific policies in the service layer 504 and the software-defined data center layer 508. The application layer 502 can have noticeably the same format and operation for respective different cloud computing environments. Accordingly, developers for the application layer 502 do not ought to understand the peculiarities of how respective cloud computing environments operate in the other layers.

Figure 6:
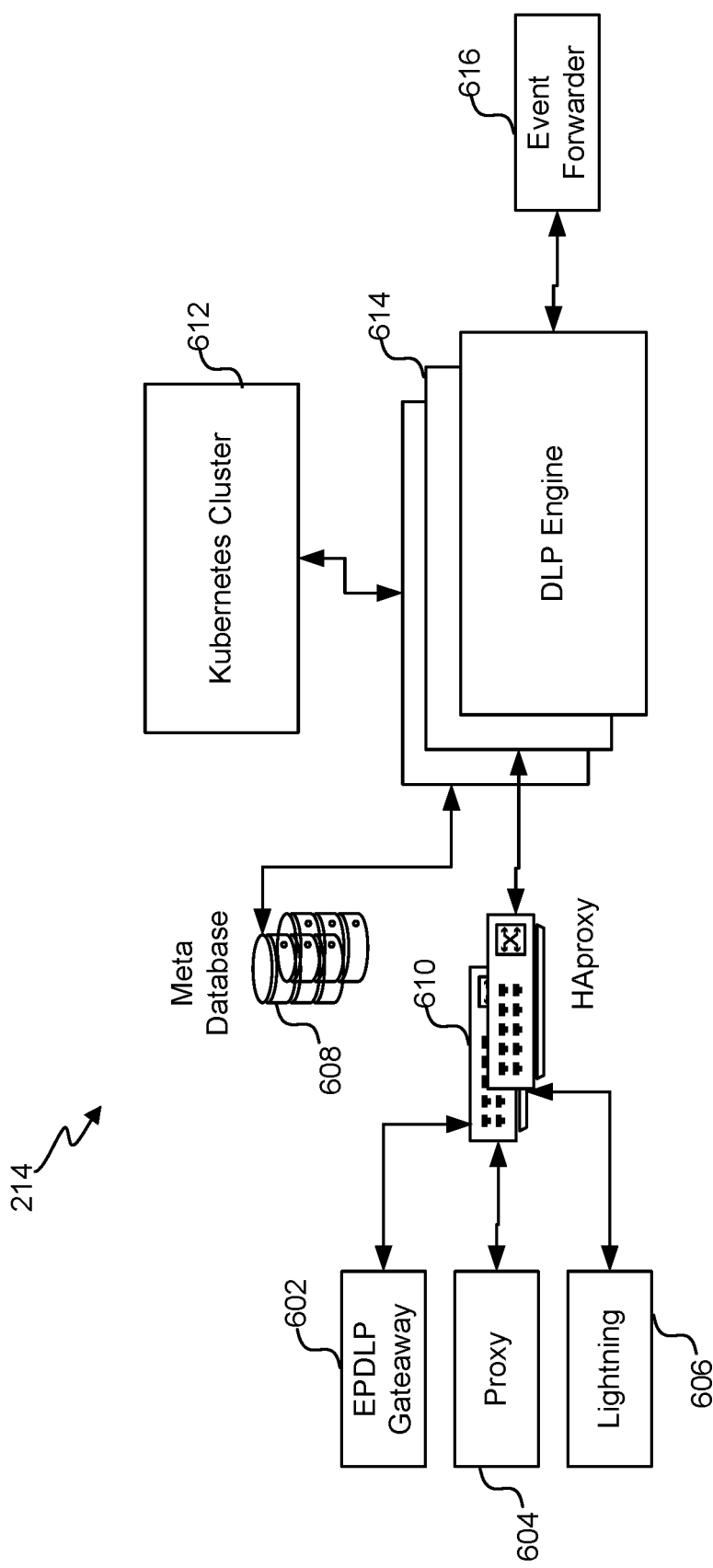
FIG. 6 illustrates a block diagram of an embodiment of a data plane of the vDLP server.

Referring next to FIG. 6, a block diagram of an embodiment of the data plane 214 of the vDLP server 110 is shown. The data plane 214 works together with the gateways 208 and enforces policies, inspects content of the video files 202, and provides insights from the extracted frames 206 to the user or viewer. The data plane 214 handles transmission, reception, and forwarding of data packets while adhering to the pre-defined policies and rules. The data plane 214 uses machine learning classifiers to ensure that sensitive content and unauthorized data is recognized and appropriately handled according to security policies. The data plane 214 further provides traffic filtering, load balancing, and acceleration and optimization of data flows. The data plane 214 manages meta databases or temporary databases i.e., a Redis to store the policies belonging to a user from one tenant separate from other users. The data plane 214 also stores the watermarks embedded in the video files 202 or key objects/ data content from the video files 202 and the extracted frames 206.

The data plane 214 consists of an endpoint DLP (EPDLP) gateway 602, a proxy block 604, and a lightning block 606. Three of these manage the DLP of cloud's clients by sending an inspection request to an HAproxy 610. The data plane 214 further includes a meta database 608, a Kubernetes cluster 612, a DLP engine 614, and an event forwarder 616. The EPDLP gateway 602 is an optional add-on to the user that provides data protection at the endpoint by utilizing cloud DLP capabilities. It allows users to monitor and govern USB storage devices connected to the end-user device 108, enabling granular control over the end-user device 108 permissions and user access. Device Control policies allow for granular control over devices and users, while Content Control policies allow for full use of the DLP engine 614 to inspect and control data movement between the end-user device 108 and a USB mass storage device.

The EPDLP gateway 602 allows users to manage the end-user device 108, prevent sensitive content from being transferred to USB storage devices, monitor activities, block or trigger alerts, respond to incidents, and coach users through custom notification messages. The EPDLP gateway 602 is further used for minimizing resource utilization, inspecting content/videos for DLP violations, and leveraging the DLP policy framework to generate alerts and incidents. The proxy block 604 acts as an intermediary or middleman between a user and the websites they browse. The proxy block 604 can be set up as a firewall or a web filter, acting as a security layer that prevents malware from entering a private network and protects the end-user device 108. The proxy block 604 is used to filter incoming traffic, making the network 102 more secure, more private, and to speed up access to resources using a cache.

The lightning block 606 is used to apply real-time controls using Office 365™ synchronous events to monitor the activity of external users accessing the sensitive content and block. Traditionally, Sanctioned DLP policy types are defined for API and Reverse Proxy deployments. While Reverse Proxy policies are used to apply inline controls using cloud access security broker (CASB) reverse proxy solution, API policies are used to enforce compliance policies in near-real-time (after the user activity is complete). Using only API policies leaves a window of potential data leaks: from the time the file or folder is shared with an external user to the time CASB's API policy takes effect and removes sharing for external users. This window could be up to 2-3 minutes and external users might access the sensitive document if they open the link sent to their emails immediately. The lightning block 606 provides an additional layer of protection by monitoring the activity of external users accessing sensitive content and blocking them in real-time without having to deploy a proxy. Note that real-time policies only work with document metadata tags and do not support content-based rules such as Data-Identifier, Keyword, and Regular Expression.

The meta database 608 stores the watermarks, key objects, extracted frames, and policies specific to users of each tenant. The high availability proxy (HAproxy) 610 is used as a load balancer to ensure high availability and reliability. The HAproxy 610 connected to the EPDLP gateway 602, the proxy block 604, the lightning block 606, and the DLP engine 614 manages the distribution of incoming traffic across the data plane 214. The HAproxy 610 can scale up or down the incoming inspection requests thus increasing the reliability of the vDLP server 110. The HAproxy 610 can also be employed inside the Kubernetes cluster 612 to manage the load.

The Kubernetes cluster 612 manages the containerized applications, providing orchestration and scaling in the data plane 214. The Kubernetes cluster 612 allows the distribution and scheduling of applications across clusters, completely abstracted from the physical or virtual machines the applications run on. The Kubernetes cluster 612 consists of a scheduler, an API server, a kube-proxy, and a controller manager. The Kubernetes cluster 612 sends a hypertext transfer protocol (HTTP) request to the DLP engine 614. The DLP engine 614 uses machine learning classifiers to detect an unusual activity from the user at the end-user device 108. The machine learning classifier can be pre-trained to custom classifiers. The DLP engine 614 then retrieves the user-specific policies for the tenant 106 from the meta database 608. If the user has violated a policy, the DLP engine 614 sends the case to the event forwarder 616. The event forwarder 616 then works together with the management plane to handle the case.

Figure 7:
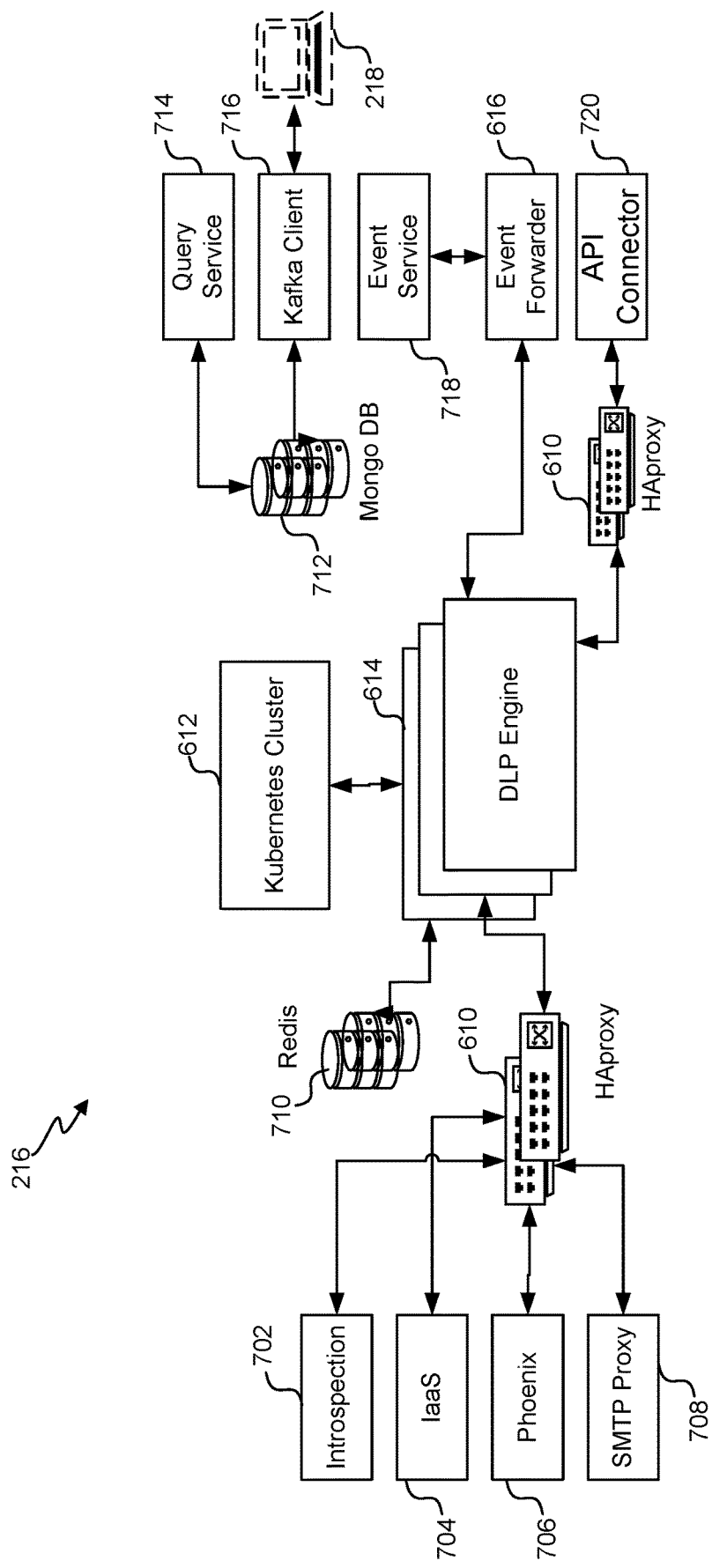
FIG. 7 illustrates a block diagram of an embodiment of a management plane of the vDLP server.

Referring next to FIG. 7, a block diagram of an embodiment of the management plane 216 of the vDLP server 110 is shown. The management plane 216 is connected to the data plane 214 via a secured tunnel i.e., VPN. The DLP tasks from the data plane 214 get assisted by the management plane 216. The management plane 216 monitors and controls the entire structure of the vDLP server 110. The management plane 216 provides introspection, controls email traffic, balances load, overseas DLP services and cache lookup. The management plane 216 further manages the query service, facilitates event streaming and monitoring through Kafka and web UI 218. The web UI 218 allows the viewer or the enterprise 114 to customize their policies and machine learning classifiers.

The management plane 216 consists of an introspection block 702, an Infrastructure as a service (IaaS) block 704, a Phoenix block 706, and a simple mail transfer protocol (SMTP) proxy block 708. The management plane 216 further consists of a temporary storage i.e., a Redis 710, the Kubernetes cluster 612, the DLP engine 614, a mongo database (DB) 712, a query service 714, a Kafka client 716, an event service 718, the event forwarder 616, and an API connector 720. The introspection block 702 examines and analyzes the internal user activities and generates a cache query. The IaaS block 704 abstracts and provides virtualized computing resources over the network 102. The phoenix block 706 is used as a proxy tool and the SMTP proxy block 708 intercepts and controls email traffic. All these blocks manage the DLP of cloud's clients by sending an inspection request to the HAproxy 610.

The Redis 710 stores cache and provides cache lookup to the DLP engine 614. The DLP engine 614 gets HTTP and ASP requests from the Kubernetes cluster 612. The DLP engine also uses the HAproxy 610 to balance its load and manage the inspection requests. The mongo DB 712 is a NoSQL database used for handling large volumes of unstructured data. The mongo DB 712 is connected to the query service 714 and the Kafka client 716. The query service 714 retrieves and provides information from the mongo DB 712 to handle queries from the end-user device 108 or the viewer. The Kafka client 716 communicates with the Kafka brokers via the network 102 for writing (or reading) events. Once received, the brokers will store the events in a durable and fault-tolerant manner in the mongo DB 712 for as long as needed. The Kafka client 716 is connected to the web UI 218. The web UI 218 allows the viewer or the enterprise 114 to customize their policies and machine learning classifiers.

The event service 718 works together with the event forwarder 616. The event forwarder 616 of the data plane 214 sends the policy violation case to the event service 718. The event service 718 checks again with the DLP engine 614 to confirm that the violation received is not a false positive. Once it is confirmed, the event service 718 sends a notification away to the tenants 106 or the enterprise 114. The management plane 216 can also use the API connector 720 to connect two or more APIs from different tenants to share information across the network 102. By using the API connector 720, the management plane 216 gets access to vast amounts of data.

Referring next to FIG. 8, user-by-user and file-by-file interactions 800 of users extracted from frames of the video file 202 is shown. The user-by-user and file-by-file interactions 800 provide detailed information about the video file 202 and its rendering. At section 802, an end-user device ID, video format and video scale along with other information is given. Similarly, section 804 shows the exact timestamp of duration of the video file 202, starting and ending time, and bitrate in kb/s. At section 806, the user-by-user and file-by-file interactions 800 gives more insights on the content and activity in the extracted frames 206. At section 806, the activity can be seen as "title: sharing stopped". It also provides the file creation time, handler name, vendor ID, video format, delays, and stream information. At section 808, the information of frames extraction is given i.e., number of frames, size of frames, time, bitrate, and speed. All these features of frame extraction can be adjusted using relevant filters and processing acceleration tools.

Figure 9:
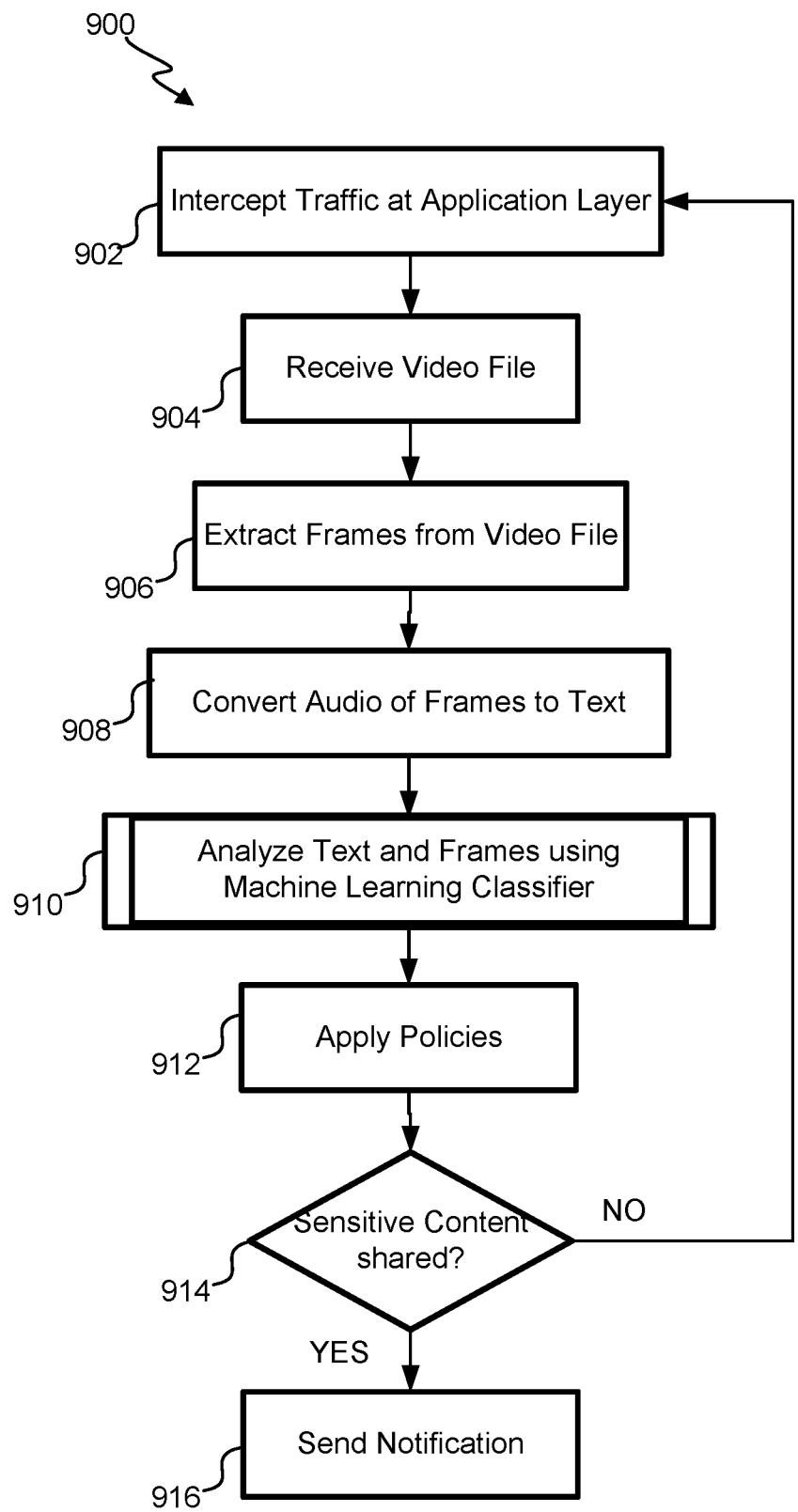
FIG. 9 illustrates a flowchart of a vDLP method carried out at an application layer of the cloud OSI model.

Referring next to FIG. 9, a flowchart of a vDLP method 900 at the application layer 502 of the cloud OSI model 500 is shown. At block 902, the vDLP server 110 intercepts traffic at the application layer 502 of the cloud OSI model 500. The vDLP server 110 acts as an intermediary server and analyzes content of video files in the network 102 to protect against data exfiltration of sensitive content.

At block 904, the vDLP server 110 receives the video files 202 from the traffic and starts its processing. This application describes one way of processing the video files 202. However, other methods and techniques can also be applied for this purpose.

At block 906, the video processor 204 of the vDLP server 110 extracts frames from the video file 202. The frames provide a thorough insight into the aspects of the video content and are useful for the machine-learning classifier. One exemplary report of the user-by-user and file-by-file interactions 800 gained by the frame extraction is provided above.

At block 908, the vDLP server 110 uses an ML engine 210 to convert audio of the video files 202 into text format. The ML engine further analyzes the content of the video file 202 and detects any suspicious internal user activity. The ML engine 210 uses an AI-based audio-to-text converter that helps in filling up the gaps in information and speeds up the process.

Once the video file 202 is converted into frames and the audio is converted into text, the vDLP server analyzes the frames and text using machine-learning classifiers at block 910. The machine-learning classifiers are present in the DLP engine 614 in the data plane 214 and the management plane 216 of the vDLP server 110. The machine-learning classifier can be a pre-trained classifier or a custom classifier. The machine-learning classifier analyzes the frames and text to detect any data exfiltration activity i.e., video file sharing, uploading, downloading, editing or PII, financial and/or sharing of any sensitive content in the video file 202.

At block 912, the vDLP server 110 applies policies related to the said activity. The policies are stored in the meta database 608. The policies are user-specific and differ from tenant to tenant. The viewer or the enterprise 114 can configure and edit those policies themselves or the machine-learning classifier can get smarter over time and can configure and modify policies itself to fit the requirements of the tenant 106.

At block 914, the vDLP server 110 determines if the sensitive content in the video file 202 is shared against a policy or the policy allows that particular user to share such information. If the sensitive content is shared according to the policy, the vDLP server 110 starts the process all over again and checks other video files. However, if the sensitive content is shared against a policy, the vDLP server 110 sends a notification away from the cloud-based network via the event service 718.

Consider a case where an employee tried to share a video file containing company's financial details outside of its tenant. The vDLP server 110 acting as a middle mile will intercept the traffic on the network 102 and receive that video file. The video processor 204 of the vDLP server 110 will then extract frames from the video file. The ML engine 210 will analyze the activity of the user and convert audio of the video file into text to help analyze the content better. The machine-learning classifiers of the DLP engine 614 analyze the text and frames and detect the presence of sensitive content inside the video file being shared. The vDLP server 110 upon detecting presence of sensitive content applies user-specific policies.

Now if the employee belongs to the finance department and is sharing the video file with a trusted entity i.e., a bank and the company's policy for that employee allows him to do so, the vDLP server 110 allows him to carry on. However, if the said employee belongs to the marketing department and tries to share the company's financial details, the vDLP server 110 checks the relevant policies. Since the policies do not allow such activity, the vDLP server 110 registers it as a violation of the policy and sends a notification away from the cloud-based network. The enterprise 114 or the company can then take necessary actions to remedy the violation.

Figure 10:
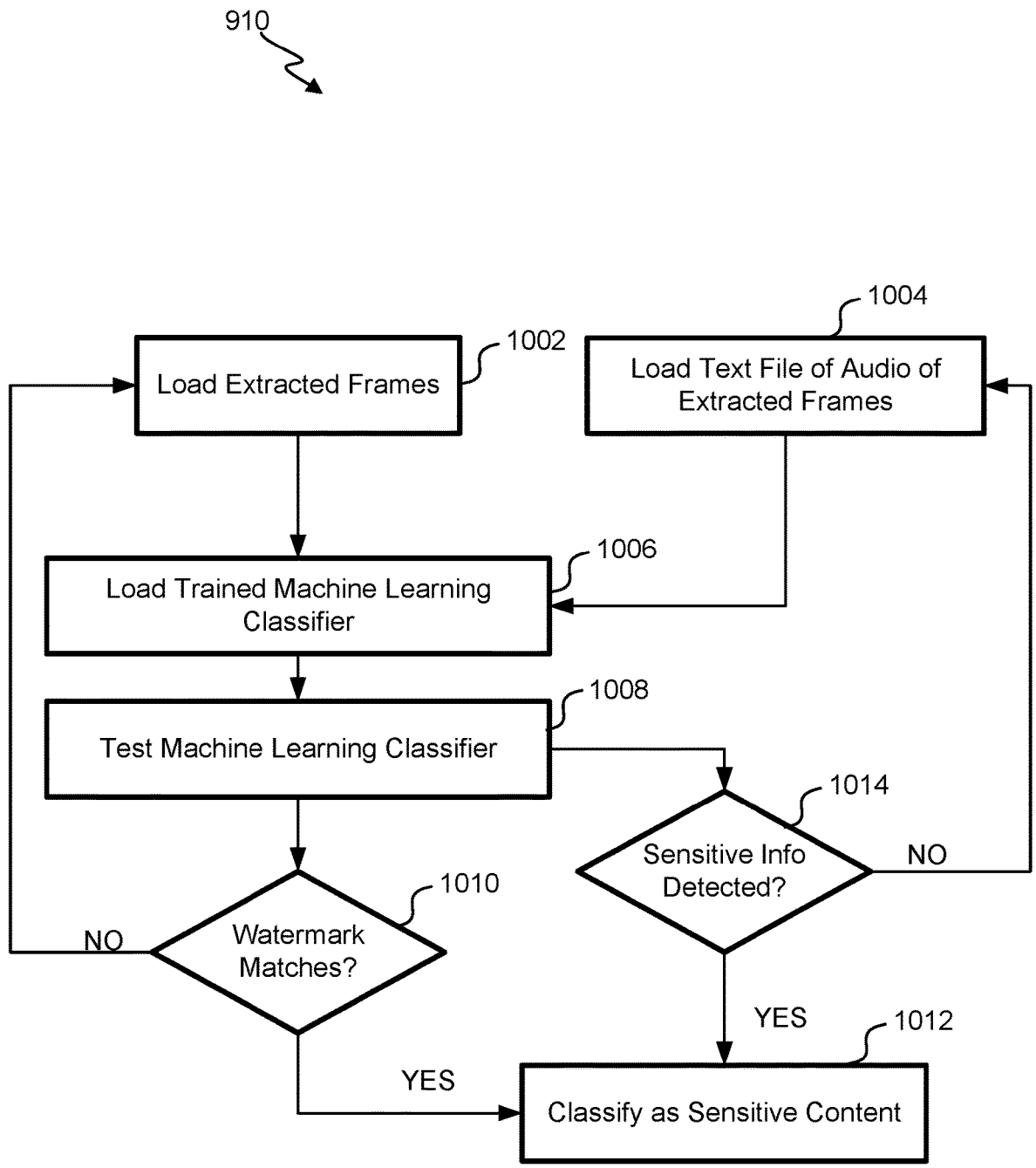
FIG. 10 illustrates a flowchart of analyzing text and frames using a trained machine-learning classifier.

Referring next to FIG. 10, a flowchart of the block 910 for analyzing text and frames using a trained machine-learning classifier is shown. At block 1002, the vDLP server 110 loads extracted frames from the meta database 608. At block 1004, the vDLP server 110 loads the text file created from the audio of the extracted frames of the video file 202.

At block 1006, the vDLP server 110 loads the trained machine-learning classifier. The trained machine-learning classifier gives accurate results and less false positive since it is trained on the vast amounts of data present on the Internet. At block 1008, the DLP engine 614 tests the machine-learning classifier. In testing of machine-learning classifier, the extracted frames from the video file are compared against the numerous video files in the meta database 608. This is done to find a match for the embedded watermark/key object in the video file.

The testing of the machine-learning classifier also includes detecting any sensitive information in the text files of the video. The content of the text is analyzed to find any sensitive passwords, codes, or credentials. At block 1010, if the embedded watermark from the frames is matched to any of other video files, then those frames are classified as sensitive content at block 1012. Otherwise, the machine-learning classifier keeps on analyzing other frames.

Similarly at block 1014, if any sensitive information is detected in the video file that should not be shared outside the tenant/enterprise' premises, then the video file is classified as sensitive content at block 1012. Otherwise, the machine-learning classifier keeps on analyzing other frames.

Figure 11:
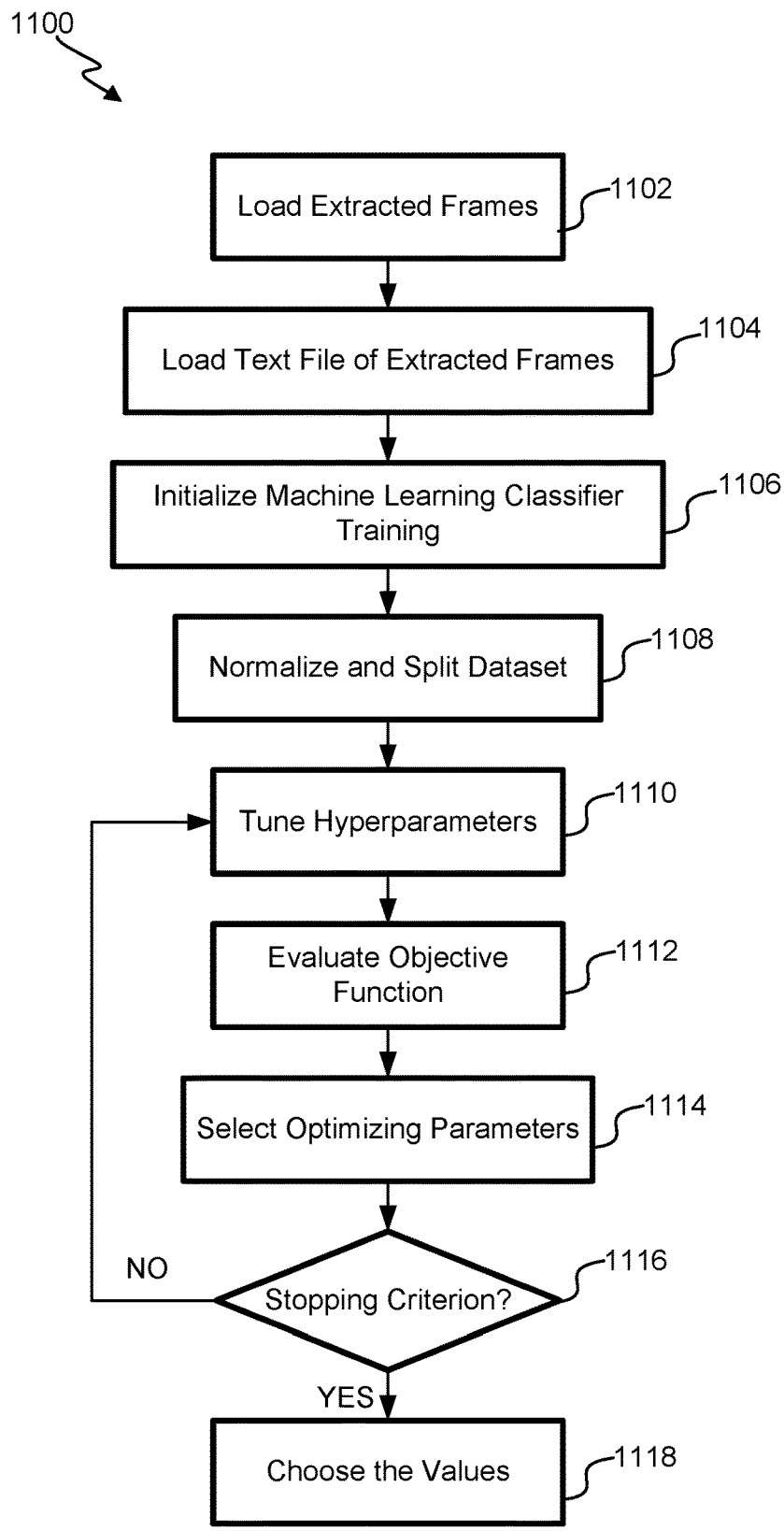
FIG. 11 illustrates a flowchart of training a custom machine-learning classifier to detect sensitive content in the video file.

Referring next to FIG. 11, a flowchart of training 1100 a custom machine-learning classifier to detect sensitive content in the video file is shown. At block 1102, the vDLP server 110 loads extracted frames from the meta database 608. At block 1104, the vDLP server 110 loads the text file created from the audio of the extracted frames of the video file 202.

At block 1106, the vDLP server 110 then initializes the machine-learning model for the training. The machine-learning model can be any machine-learning algorithm designed to recognize patterns like random forest algorithms, k-means clustering, neural networks etc.

At block 1108, the machine-learning algorithm functions by normalizing the variables and splitting a dataset. The dataset is typically divided into two or more subsets: a training set and a validation set. The training set is used to train the machine-learning model while the validation set helps in model selection and hyperparameter tuning. The machine-learning models often have hyperparameters that are tuned to optimize performance.

At block 1110, the hyperparameters are tuned for optimized performance. Note that the hyperparameters are not learned from the data but are set before training. Techniques like grid search, random search, or Bayesian optimization are used to find the optimal combination of hyperparameters. The machine-learning model has an objective function, which depends on the specific problem and the goals of the optimization task. The objective function typically takes one or more parameters or variables as input and produces a scalar value as output.

At block 1112, the machine-learning model learns to capture patterns and relationships in the dataset while training by adjusting and optimizing its internal parameters. This is often an iterative process and various optimization algorithms are used to update model parameters.

At block 1114, the optimization process finds the parameters or configurations that optimize the value of the objective function. Various optimization algorithms are used to iteratively adjust the parameters to improve the performance of the machine-learning model. These algorithms can include gradient descent, stochastic gradient descent (SGD), genetic algorithms, or Bayesian optimization.

At block 1116, the machine-learning model is run in loops for tuning hyperparameters, evaluating objective functions, and optimizing parameters until a specified stopping criterion is achieved. The objective function is often evaluated using the training dataset, which includes input data and their corresponding ground truth or target values. At block 1118, the values are chosen at which the stopping criterion is met.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process that is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as a limitation on the scope of the disclosure.

We claim:

1. A video data loss prevention (vDLP) system that uses machine-learning for protection against data exfiltration of sensitive content across a plurality of tenants in a cloud-based network, the vDLP system comprises:
    a tenant of the plurality of tenants in the cloud-based network, the tenant includes a plurality of end-user devices; and
    a vDLP server operable to:
        intercept traffic at an application layer of the cloud-based network;
        receive a video file from traffic within the cloud-based network, wherein a viewer for the video file is remote from the cloud-based network;
        recognize text of audio and a plurality of frames extracted from the video file using a machine-learning engine;
        analyze the plurality of frames and text for the video file using a plurality of machine-learning classifiers;
        enforce a plurality of policies against the plurality of machine-learning classifiers for protection against data exfiltration of the sensitive content in the video file, wherein the machine learning classifiers are used to recognize the sensitive content and unauthorized data and appropriately handle the sensitive content according to the plurality of policies; and
        in response to enforcing the plurality of policies, send a notification away from the cloud-based network upon detection of violation of a policy of the plurality of policies.

2. The vDLP system of claim 1, wherein the machine-learning engine uses artificial intelligence to recognize text and content of the video file.

3. The vDLP system of claim 1, wherein the plurality of machine-learning classifiers can be pre-trained or customized.

4. The vDLP system of claim 1, wherein the plurality of machine-learning classifiers are configured to:
    analyze text for sensitive information;
    match a watermark embedded in the video file with a plurality of watermarks stored in a meta database; and
    classify the sensitive content of the video file if sensitive information is detected or the watermark is matched.

5. The vDLP system of claim 1, wherein the plurality of policies differs for the plurality of end-user devices belonging to the plurality of the tenants within the cloud-based network.

6. The vDLP system of claim 1, wherein the plurality of frames extracted from the video file, a plurality of watermarks, and the plurality of policies are stored in a meta database.

7. The vDLP system of claim 1, wherein the plurality of machine-learning classifiers gets smarter over time and can modify the plurality of policies on their own to fit requirements of the tenant.

8. A video data loss prevention (vDLP) method that uses machine-learning for protection against data exfiltration of sensitive content across a plurality of tenants in a cloud-based network, the vDLP method comprises:
    intercepting traffic at an application layer of the cloud-based network;
    receiving a video file from the traffic within the cloud-based network, wherein a viewer for the video file is remote from the cloud-based network;
    recognizing text of audio and a plurality of frames extracted from the video file using a machine-learning engine;
    analyzing the plurality of frames and text for the video file using a plurality of machine-learning classifiers;
    enforcing a plurality of policies against the plurality of machine-learning classifiers for protection against data exfiltration of the sensitive content in the video file, wherein the machine learning classifiers are used to recognize the sensitive content and unauthorized data and appropriately handle the sensitive content according to the plurality of policies; and
    in response to enforcing the plurality of policies, sending a notification away from the cloud-based network upon detection of violation of a policy of the plurality of policies.

9. The vDLP method of claim 8, wherein the machine-learning engine uses artificial intelligence to recognize text and content of the video file.

10. The vDLP method of claim 8, wherein the plurality of machine-learning classifiers can be pre-trained or customized.

11. The vDLP method of claim 8, wherein the plurality of machine-learning classifiers are configured to:
    analyze text for sensitive information;
    match a watermark embedded in the video file with a plurality of watermarks stored in a meta database; and
    classify the sensitive content of the video file if sensitive information is detected or the watermark is matched.

12. The vDLP method of claim 8, wherein the plurality of policies differs for a first end-user device belonging to a first tenant of the plurality of tenants and a first end-user device belonging to a second tenant of the plurality of tenants within the cloud-based network.

13. The vDLP method of claim 8, wherein the plurality of frames extracted from the video file, a plurality of watermarks, and the plurality of policies are stored in a meta database.

14. The vDLP method of claim 8, wherein the plurality of machine-learning classifiers gets smarter over time and can modify the plurality of policies on their own to fit requirements of a tenant.

15. A non-transitory computer-readable media having computer-executable instructions embodied thereon that when executed by one or more processors, facilitate a video data loss prevention (vDLP) method that uses machine-learning for protection against data exfiltration of sensitive content across a plurality of tenants in a cloud-based network, the computer-readable media comprises:
    intercepting traffic at an application layer of the cloud-based network;
    receiving a video file from the traffic within the cloud-based network, wherein a viewer for the video file is remote from the cloud-based network;
    recognizing text of audio and a plurality of frames extracted from the video file using a machine-learning engine;
    analyzing the plurality of frames and text for the video file using a plurality of machine-learning classifiers;
    enforcing a plurality of policies against the plurality of machine-learning classifiers for protection against data exfiltration of the sensitive content in the video file, wherein the machine learning classifiers are used to recognize the sensitive content and unauthorized data and appropriately handle the sensitive content according to the plurality of policies; and in response to enforcing the plurality of policies, sending a notification away from the cloud-based network upon detection of violation of a policy of the plurality of policies.

16. The non-transitory computer-readable media of claim 15, wherein the machine-learning engine uses artificial intelligence to recognize text and content of the video file.

17. The non-transitory computer-readable media of claim 15, wherein the plurality of machine-learning classifiers can be pre-trained or customized.

18. The non-transitory computer-readable media of claim 15, wherein the plurality of machine-learning classifiers are configured to:

analyze text for sensitive information;

match a watermark embedded in the video file with a plurality of watermarks stored in a meta database; and classify the sensitive content of the video file if sensitive information is detected or the watermark is matched.

19. The non-transitory computer-readable media of claim 15, wherein the plurality of policies differs for a first end-user device belonging to a first tenant of the plurality of the tenants and a first end-user device belonging to a second tenant of the plurality of the tenants within the cloud-based network.

20. The non-transitory computer-readable media of claim 15, wherein the plurality of machine-learning classifiers gets smarter over time and can modify the plurality of policies on their own to fit requirements of a tenant.

* * * * *